United States Patent [19]
Smith, II

[11] 3,824,540
[45] July 16, 1974

[54] BICYCLE LOCK AND ALARM APPARATUS

[76] Inventor: Kobert Reynierson Smith, II, Ryco, One First St., Los Altos, Calif. 94022

[22] Filed: July 27, 1972

[21] Appl. No.: 275,802

[52] U.S. Cl. ............ 340/63, 70/233, 116/33, 180/114, 340/256, 340/280
[51] Int. Cl. .............. B60r 25/10, G80b 21/00
[58] Field of Search ............ 340/63, 256, 280, 283, 340/274; 70/225, 226, 227, 234, 17, 233; 307/10 AT, 255; 180/114; 116/33, 62, 81

[56] References Cited
UNITED STATES PATENTS

| | | | |
|---|---|---|---|
| 481,236 | 8/1892 | Macauley | 70/226 |
| 597,891 | 1/1898 | Walstrom et al. | 70/234 |
| 736,409 | 8/1903 | Kuhn | 116/33 |
| 1,747,194 | 2/1930 | Thomas | 340/280 |
| 2,988,708 | 6/1961 | Schmidt | 340/256 |
| 3,619,658 | 11/1971 | Prunty | 307/255 |
| 3,755,778 | 8/1973 | Kennedy et al. | 340/65 |
| 3,781,861 | 12/1973 | Adler, Jr. et al. | 340/280 |

Primary Examiner—John W. Caldwell
Assistant Examiner—Joseph E. Nowicki
Attorney, Agent, or Firm—Flehr, Hohbach, Test, Albritton & Herbert

[57] ABSTRACT

A bicycle lock and alarm apparatus for use as a preventive or deterrent device in controlling bicycle thievery. A continuous cable adapted to extend through the bicycle wheels and also about the bicycle frame to immobilize the wheels and locking means to join the ends of the cable to form a loop. An electrical circuit including an electrical conductor running through the length of the cable and responsive to interruption of the conductor for activating an alarm.

2 Claims, 5 Drawing Figures

PATENTED JUL 16 1974 3,824,540

BICYCLE LOCK AND ALARM APPARATUS

BACKGROUND OF THE INVENTION

The present invention is directed to a locking and alarm device and more particularly a device to be used in conjunction with immobilizing the wheels of a bicycle and providing an alarm indication if the lock is removed other than in the normal fashion.

Bicycle sales have recently risen to unexpected heights and for the first time appear to be well on their way to exceeding in number the sale of new automobiles. Accompanying the burgeoning popularity of the bicycle is a burden placed on the law enforcement agencies in populous areas in the form of prevention and investigation of bicycle theft. Some law enforcement agencies have estimated that up to four percent of the total number of bicycles in a given area will be subject to theft this year.

In many instances of bicycle theft the bicycles have been properly locked when left unattended by their owners. The locks have been cut and the bicycles ridden or carried away. In many instances of this type an audible alarm would have alerted the owner nearby, or others in the immediate area, of the impending theft. In many instances the alarm would have immediately frightened the potential thief from the scene, admittedly leaving behind a lock with a cut cable, but also the bicycle.

OBJECTS AND SUMMARY OF THE INVENTION

It is a general object of the invention to provide a deterrent to bicycle theft.

It is another object of the invention to provide a sturdy locking device constituting a mechanical bar to bicycle theft.

It is another object of the invention to provide a loud audible alarm as a warning of tampering with the locking device as might occur during an attempt to steal the bicycle.

It is another object of the invention to apprise potential bicycle thieves of the difficulties involved in spiriting away a protected bicycle.

The invention described herein is a bicycle lock and alarm apparatus which has a cable of sufficient length to extend through the wheels and the framework of a bicycle upon which it is adapted to be installed. There are locking means afforded to join the ends of the cable to form a continuous loop. The cable contains a continuous conductor which is an integral part of a circuit which also includes a buzzer alarm. The conductor is positioned in the circuit in such a manner as to actuate the buzzer alarm in the event the conductor is cut. Cables are replaceable in the lock assembly.

DETAILED DESCRIPTION OF THE PREFERRED EMBODIMENT

Figure 1:
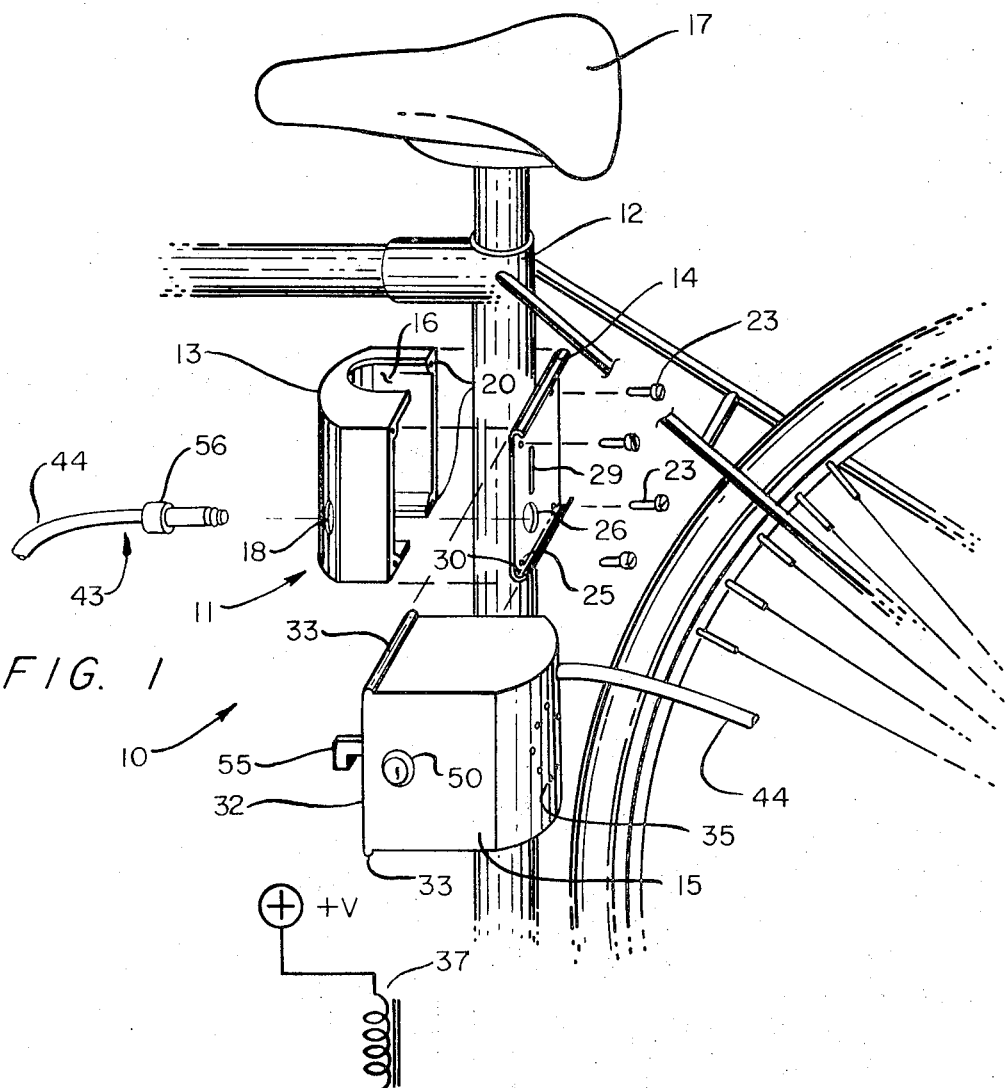
FIG. 1 is an exploded view showing the installation of the apparatus on the bicycle frame.

Referring to FIG. 1 there is shown an exploded view of the bicycle lock and alarm apparatus assembly 10 as well as the manner in which it is attached to a bicycle framework 12. A receptacle means 11 joins the ends of a cable as hereinafter described and in this embodiment includes a bolt receiving member 13, a mounting plate 14, and a lock-alarm case 15.

The bolt receiving member 13 which may be molded of some durable impact resistant plastic, has a clearance space 16 extending therethrough for receiving a portion of the framework 12. In this embodiment the clearance 16 is adapted to fit around thact portion of the framework 12 immediately below and supporting a bicycle seat 17. Bolt guide 18 extends through the member 13 in a direction at right angles to the clearance space 16 and to one side thereof. The bolt guide 18 has a slot 19 in one wall extending in a direction parallel to the axis of the guide 18. The bolt receiving member 13 also has a pattern of holes 20 adapted to receive screws 23.

The mounting plate 14 has a pattern of holes 25 which match the pattern of holes 20 in the bolt receiving member 13. The screws 23 are inserted through the holes 25 in the mounting plate 14 to engage the threads of holes 20 to affix the member 13 and plate 14 to the bicycle frame 12. The mounting plate 14 may have a hole 26 in line with the bolt guide 18 and of substantially the same diameter as the inside of the bolt guide 18. The plate has a narrow slot 29 running in a vertical direction through the mounting plate 14 on a center line of the hole 26. The plate 14 may be a metal plate with its top and bottom edges bent through approximately 180° to form case guides 30 opposite the side mounting the bolt receiving member 13.

The lock-alarm case or box 15 which may also be formed of some durable impact resistant plastic material has an open face 32 with flanges 33 located at the top and bottom of the open face 32. The case 15 has a plurality of holes 35 in communication with the inside of the case 15. Holes 35 are present to pass audible sound across the wall of case 15. In the event the case is fabricated of a substance capable of transmitting audible sound directly therethrough the holes become unnecessary. The flanges 33 are adapted to be inserted into the case guides 30 on the mounting plate 14 when the lock alarm case 15 is in the locked position.

Figure 2:
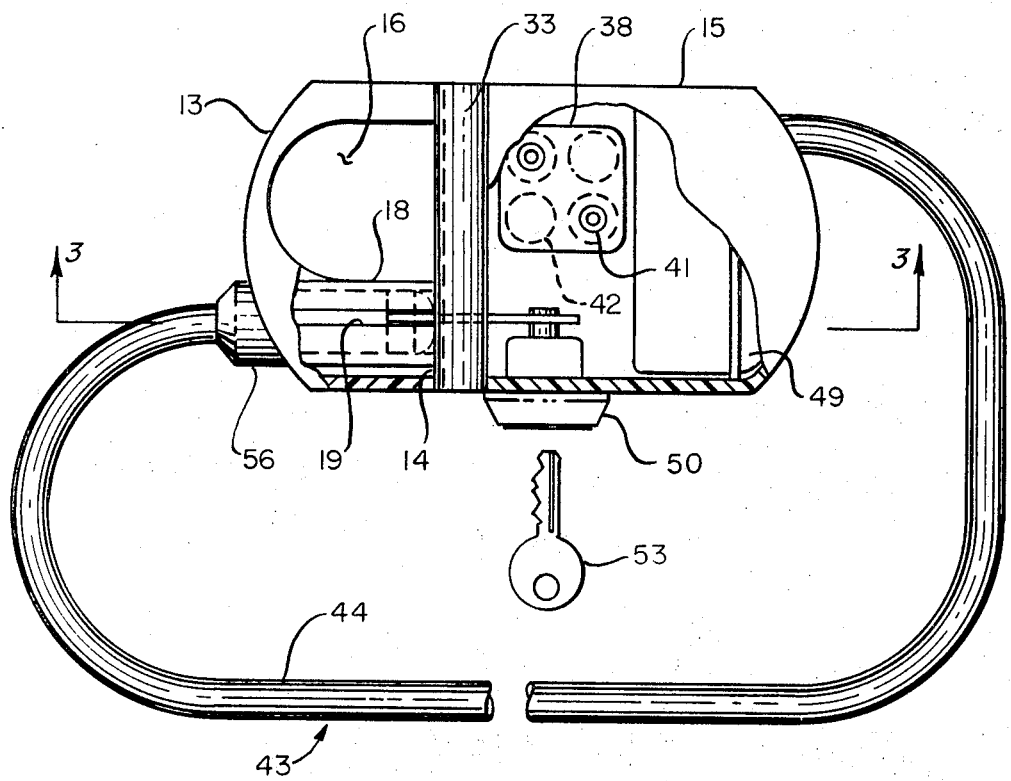
FIG. 2 is a plan view of the cable and the locking device in the preferred embodiment.
Figure 3:
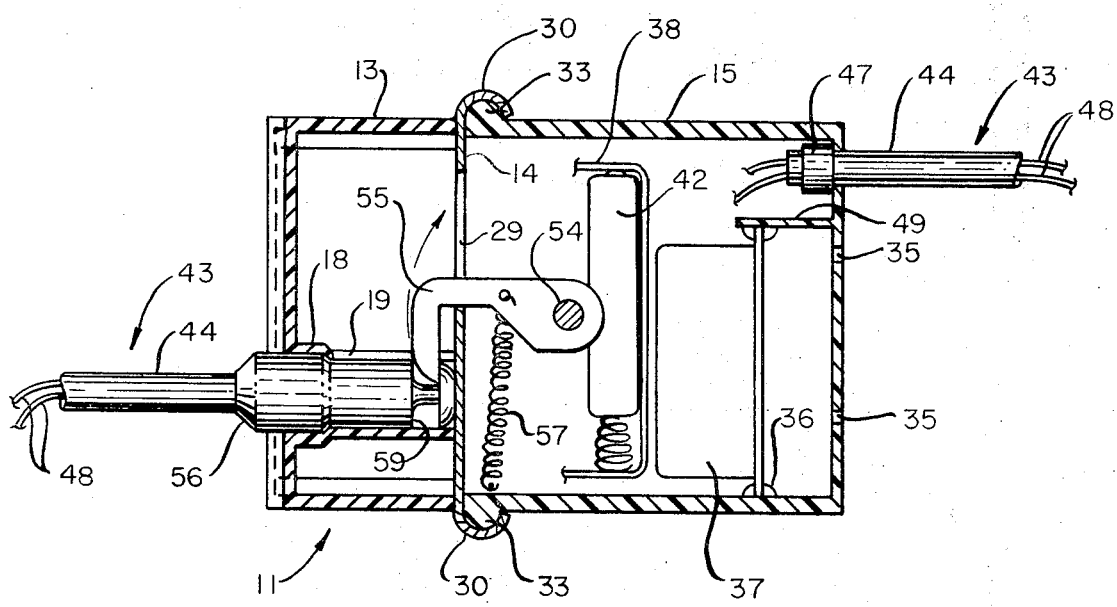
FIG. 3 is a sectional elevation showing the assembly of the parts and the configuration of the bolt and the latch.

Referring to FIGS. 2 and 3 it may be seen that the lock alarm case 15 includes mounting means 36 for mounting an alarm 37, such as a buzzer adjacent to the holes 35. Battery mounting means 38 is located inside the case 15 and may be of a material such as plastic. In this embodiment the battery mounting means 38 carries proper terminals and connections 41 to place four 1.5 volt pen-light batteries 42 in series thus providing a 6 volt source voltage.

Figure 4:
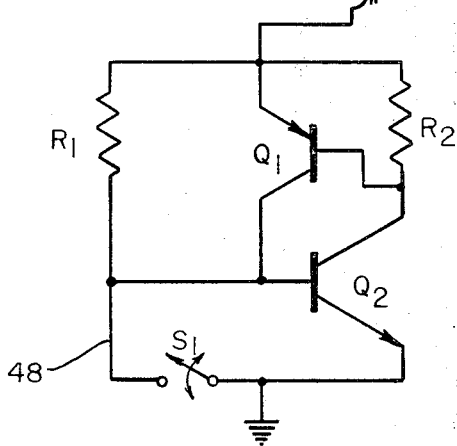
FIG. 4 is a schematic circuit diagram showing the circuit contained in the preferred embodiment.

Electrical circuitry as seen in FIG. 4 provides a normally "off" relay function between the batteries 42 and the alarm 37. The 6 volt terminal of the batteries 42 is connected to one side of the alarm 37. The other side of alarm 37 is connected to the emitter of a PNP transistor Q1. R2 represents a biasing resistor between the emitter and the base of Q1. The collector of Q1 is connected to the base of an NPN transistor Q2. The collector of Q2 is connected to the base of Q1. The Q2 emitter goes off to ground. Resistor R1 is connected between the emitter of Q1 and the base of Q2, serving as a bias resistor for Q2 when the base of Q2 is unclamped from ground.

A cable 43 which may have a plastic jacket 44 is secured to the inside of case 15 by a grommet 47. A continuous conductor 48 runs through the length of the cable 43 inside the jacket 44 and provides a connection between the emitter and the base of transistor Q2 as seen in FIG. 4, thus placing the base at ground potential. The internal configuration of case 15 is such as to provide mounting means 49 for the various circuit components.

The lock-alarm case 15 is adapted to mount locking means 50 extending through one wall of the case 15. In this embodiment locking means 50 is shown as a key operated tumbler type lock, but it is also anticipated that a conforming type of combination lock might be used. An appropriate lock release such as key 53 is utilized to cause rotation of revolving plug 54. Mounted on revolving plug 54 is latch 55 which is of a thickness such as to pass freely through the bolt guide slot 19 and the slot 29 in mounting plate 14. Latch 55 is yieldably urged to a latched position by spring 57.

Mounted on the end of cable 43 is bolt 56 of a size and shape adapted to fit into bolt guide 18. Bolt 56 has a bolt notch 59 near its free end adapted to receive latch 55. Continuous conductor 48 extends well into the interior of bolt 56, when it is mounted on the end of cable 43.

Turning now to the operation of the bicycle lock-alarm it can be seen from FIG. 2 that bolt receiving member 13 and mounting plate 14 are fixedly mounted to the framework 12 by installing screws 23. The lock alarm case 15 containing one end of cable 43, locking means 50 and latch 55, buzzer alarm 37, and the electrical circuit and connections as shown in FIG. 4, is then installed on the locking plate 14 in the following manner. Top and bottom flanges 33 of lock alarm case 15 are aligned with the top and bottom case guides 30 on mounting plate 14. Key 53 is inserted into locking means 50 and rotated to cause latch 55 to clear mounting plate 14 as case 15 is slid into case guides 30 such that flanges 33 are totally engaged. Latch 55 positioned by spring 57 returns to its loaded position, passing through slot 29 and bolt guide slot 19 when key 53 is released. Cable 43 is now extended through the rear wheel of the bicycle, interlaced through the framework 12 as desired, through the front wheel of the bicycle and back to the bolt receiving member 13. Bolt 56 on the end of cable 43 is then inserted into bolt guide 18 whereupon latch 55 is displaced upward by the leading end of bolt 56 until bolt notch 59 lies beneath latch 55, whereupon latch 55 is brought into engagement with bolt 56 at notch 59 by spring 57.

The installation of the lock-alarm device described above can be seen to immobilize the bicycle wheels providing a mechanical lock preventing operation of the bicycle. It is also anticipated that the cable 43 will be utilized to enclose some firmly implanted or bulky object to prevent the bicycle from being removed in an inoperative condition. Under these circumstances the determined bicycle thief is quite likely to attempt to cut cable 43 to facilitate removal of the bicycle from the scene. In such an event an abrasive audible alarm emits from the lock-alarm case 15 in the following manner. Referring now to FIG. 4, switch S1 represents an interruption in the continuous conductor 48 which holds the base of Q2 at ground potential. Such a switch opening occurs when cable 43 is cut. The base of Q2 is normally biased to an "off" condition by maintaining it at the same potential as the emitter. When the base of Q2 is unclamped from the emitter potential by opening S1, or cutting cable 43, it is immediately placed above the emitter potential by virtue of a circuit extending from the positive voltage through the buzzer alarm 37, and through R1 to the base of Q2. Q2, being an NPN transistor, conducts when the base is placed in a positive condition with respect to the emitter and a forward voltage is placed between collector and emitter. Thus the circuit begins to draw current from the battery source 42 through buzzer alarm 37 and resistor R2 to ground. The buzzer 37 thus begins to produce an audible alarm. The drop of voltage through R2 due to conduction through Q2 places the base of Q1 at a potential lower than the emitter of Q1. Q1 being a PNP device conducts when the base voltage is lower than the emitter voltage and a forward voltage is placed between emitter and collector. This places a higher potential at the base of transistor Q2 causing Q2 to fully conduct. There is some voltage drop in the circuit from the emitter of Q1 to ground and therefor buzzer alarm 37 must be capable of fully operating at less than the positive terminal voltage V. In this embodiment the alarm 37 is capable of full operation at 3 volts.

The alarm continues to emit its abrasive sound as long as power is applied when conductor 48 is cut, which is represented by placing S1 in FIG. 4 in an open condition. It can be seen that if S1 is closed the audible alarm will cease. In this embodiment if S1 remains open the circuit draws approximately a 1 amp transient initially, reducing to 300 to 400 milliamps steady state, which is sustainable by the batteries 42 for up to a 1 hour period. The circuit shown in FIG. 4 thus acts as a relay which is normally held in the "off" position, and is turned "on" by severing conductor 48 represented by opening Switch S1.

It can be seen that the invention described herein does not require electrical contact to be made when bolt 56 is engaged by latch 55 and the assembly is locked together. All electrical connections are made at manufacturing assembly, which considerably enhances the reliability of the lock-alarm feature. Thus it is seen that the lock and alarm apparatus assembly described herein provides both a physical and psychological deterrent for potential bicycle thieves. Its sturdy construction practically precludes destruction on the bicycle. In the event the physical locking cable is cut it is likely the potential thief will be induced by the alarm to flee without the intended object of his larceny.

Figure 5:
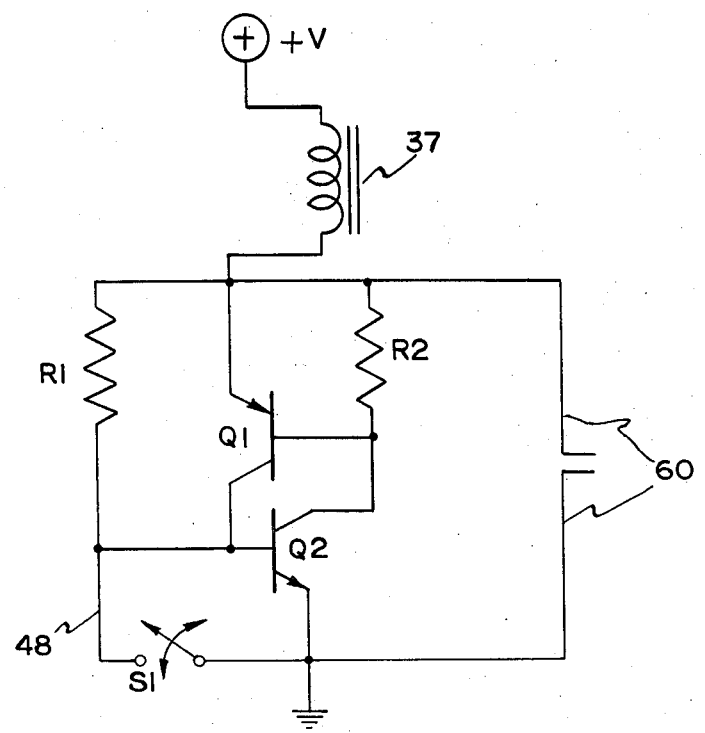
FIG. 5 is a schematic circuit diagram showing a modification of the circuit contained in the preferred embodiment.

Another embodiment of the invention disclosed herein includes an additional feature which is shown in FIG. 5. This embodiment contains all of the features mentioned heretofore and has an additional characteristic designed to discourage the more sophisticated bicycle thief. A person determined to steal a bicycle with the disclosed type of lock installed and having some knowledge of the circuitry contained, may attempt to make contact with the continuous conductor 48 contained in the cable 44 and create a path parallel to the conductor 48 outside of the bicycle frame and wheels.